a2

United States Patent
Newman et al.

(10) Patent No.: US 7,552,265 B2
(45) Date of Patent: Jun. 23, 2009

(54) SYSTEM AND METHOD FOR PROVIDING CONTEXT INFORMATION

(75) Inventors: Mark Webster Newman, San Francisco, CA (US); Warren Keith Edwards, San Francisco, CA (US); Jana Zdislava Sedlvy, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 381 days.

(21) Appl. No.: 10/052,585

(22) Filed: Jan. 23, 2002

(65) Prior Publication Data
US 2003/0149823 A1 Aug. 7, 2003

(51) Int. Cl.
G06F 13/14 (2006.01)
G06F 15/163 (2006.01)
G06F 3/00 (2006.01)

(52) U.S. Cl. .................. 710/305; 709/223; 719/321; 399/8

(58) Field of Classification Search ............... 710/104, 710/300–304, 305, 62, 63; 709/301–303, 709/221, 217, 223–225, 227; 719/321, 319; 399/8–10, 16–19
See application file for complete search history.

(56) References Cited

U.S. PATENT DOCUMENTS

| | | | | |
|---|---|---|---|---|
| 4,553,200 A * | 11/1985 | Sibley | ................. | 714/34 |
| 6,009,480 A * | 12/1999 | Pleso | ................. | 719/321 |
| 6,148,346 A * | 11/2000 | Hanson | ................. | 719/321 |
| 6,453,127 B2 * | 9/2002 | Wood et al. | ................. | 399/8 |
| 6,470,007 B1 * | 10/2002 | Berman | ................. | 370/351 |
| 6,535,929 B1 * | 3/2003 | Provino et al. | ................. | 719/321 |
| 6,742,015 B1 * | 5/2004 | Bowman-Amuah | ................. | 718/101 |
| 6,842,906 B1 * | 1/2005 | Bowman-Amuah | ................. | 719/330 |
| 7,239,409 B2 * | 7/2007 | Parry | ................. | 358/1.15 |
| 7,312,887 B2 * | 12/2007 | Wu | ................. | 358/1.15 |

FOREIGN PATENT DOCUMENTS

WO WO 99/44124 9/1999

OTHER PUBLICATIONS

U.S. Appl. No. 09/838,933, dated Apr. 20, 2001 by Edwards et al.
Bluetooth Consortium 2001, *Specification of the Bluetooth System*, Version 1.1 core, Table of Contents and Index (2001) [Retrieved from the Internet at http://www.bluetooth.com on Sep. 27, 2001].

(Continued)

*Primary Examiner*—Glenn A Auve
*Assistant Examiner*—Trisha Vu
(74) *Attorney, Agent, or Firm*—Park, Vaughan & Fleming LLP

(57) ABSTRACT

Systems and methods for enabling arbitrary components to transfer current, contextual data between each other without requiring prior knowledge of each other. The contextual data may include executable computer language instructions or a type, operating status, identity, location, administrative domain or environment information of the components or its users. The system includes a set of arbitrary components associated with one or more universal interfaces. The one or more universal interfaces may include mobile code, a contextual interface, a notification interface, a user interface and a data source interface. A first component at least has a universal contextual interface. A second component may invoke the universal contextual interface and execute associated instructions to transfer contextual data between the first component and the second component.

28 Claims, 5 Drawing Sheets

OTHER PUBLICATIONS

Bluetooth Consortium 2001, *Specification of the Bluetooth System*, Version 1.1 core, Part C, pp. 184-252 (2001) [Retrieved from the Internet at http://www.bluetooth.com on Sep. 27, 2001].

Bluetooth Consortium 2001, *Specification of the Bluetooth System*, Version 1.1 core, Part D, pp. 255-330 (2001) [Retrieved from the Internet at http://www.bluetooth.com on Sep. 27, 2001].

Bluetooth Consortium 2001, *Specification of the Bluetooth System*, Version 1.1 core, Part E, pp. 332-392 (2001) [Retrieved from the Internet at http://www.bluetooth.com on Sep. 27, 2001].

Bluetooth Consortium 2001, *Specification of the Bluetooth System*, Version 1.1 core, Part F:1, pp. 394-424 (2001) [Retrieved from the Internet at http://www.bluetooth.com on Sep. 27, 2001].

Bluetooth Consortium 2001, *Specification of the Bluetooth System*, Version 1.1 core, Part F:4, pp. 512-534 (2001) [Retrieved from the Internet at http://www.bluetooth.com on Sep. 27, 2001].

Bluetooth Consortium 2001, *Specification of the Bluetooth System*, Version 1.1 core, Part H:2, pp. 782-796 (2001) [Retrieved from the Internet at http://www.bluetooth.com on Sep. 27, 2001].

Bluetooth Consortium 2001, *Specification of the Bluetooth System*, Version 1.1 core, Appendix III, pp. 914-922 (2001) [Retrieved from the Internet at http://www.bluetooth.com on Sep. 27, 2001].

N. Borenstein et al., "MIME (Multipurpose Internet Mail Extensions): Mechanisms for Specifying and Describing the Format of Internet Messages," pp. 1-77 (1992) [Retrieved from the Internet at http://www.oac.uci.edu/indiv/ehood/M1ME/1521/rfc1521TOC.html on Sep. 14, 2001].

E. Christensen et al., *Web Services Description Language (WSDL) 1.1*, (Jan. 23, 2001) [Retrieved from the Internet at http://msdn.microsoft.com/xml/general/wsdl.asp on Sep. 27, 2001].

N. Cutland, Computability, *Cambridge University Press*, pp. 7-42 (1980).

A. Dey et al., "A Conceptual Framework and a Toolkit for Supporting the Rapid Prototyping of Context-Aware Applications," *Human Computer Interaction Journal*, 16:1-67 (2001).

P. Dourish et al., "Extending Document Management Systems with User-Specific Active Properties," *ACM Transactions on Information Systems*, Xerox Palo Alto Research Center, pp. 1-27 (2000).

N. Economides, "The Economics of Networks," *International Journal of Industrial Organization*, 14:2, pp. 1-36 (1996).

W. K. Edwards, "Session Management for Collaborative Applications," *Proceedings of ACM Conference on Computer-Supported Cooperative Work (CSCW '94)*, Georgia Institute of Technology, Chapel Hill, NC, (1994).

A. Fox et al., "Integrating Information Appliances into an Interactive Space," *IEEE Computer Graphics and Applications*, Stanford University, 20:3, pp. 54-65 (2000).

E. Gamma et al., *Design Patterns: Elements of Reusable Object-Oriented Software*, Addison-Wesley, pp. 1-31 (1995).

Y. Goland et al., *Simple Service Discovery Protocol/1.0: Operating Without an Arbiter*, Internet Engineering Task Force Internet Draft (1999) [Retrieved from the Internet at http://www.upnp.org/draft_cai_sssdp_vl_03.txt on Sep. 14, 2001].

C. Gray et al., "Leases: An Efficient Fault-Tolerant Mechanism for Distributed File Cache Consistency," *Proceedings of the 12th ACM Symposium on Operating Systems Principles (SOSP)*, Association of Computing Machines, pp. 202-210 (1989).

*User Interface Modelling Language 2.0 Draft Specification* Harmonia, Inc., pp. 1-64, (2000) [Retrieved from the Internet at http://www.uiml.org/specs/uim12/index.htm on Sep. 14, 2001].

T. Hodes et al., "A Document-Based Framework for Internet Application Control," *Proceedings of the Second USENIX Symposium on Internet Technologies and Systems (USITS)*, USENIX Association, Boulder, CO, pp. 59-70 (1999).

D. Iseminger, *COM+ Developer's Reference*, Microsoft Press, pp. 1-6 (2000).

E. Kiciman et al., "Using Dynamic Mediation to Integrate COTS Entities in a Ubiquitous Computing Environment," *Proceedings of the Second International Symposium on Handheld and Ubiquitous Computing (HUC)*, Stanford University (2000).

G. Kiczales et al., *The Art of the Metaobject Protocol*, MIT Press, pp. 12-46 (1991).

T. Kindberg et al., "A Web-Based Nomadic Computing System," *HP Labs Technical Report HPL-2000-110*, pp. 1-13 (2000) [Retrieved from the Internet at http://cooltown.hp.com/papers/nomadic/nomadic.htm on Sep. 14, 2001].

[Author Unknown] "Plug and Play Specifications," Microsoft Corp., (1999) [Retrieved from the Internet at http://www.microsoft.com/HWDEV/respec/pnpspecs.htm on Sep. 14, 2001].

[Author Unknown] "Universal Plug and Play," Microsoft Corp. (2000) [Retrieved from the Internet at http://msdn.microsoft.com/library/psdk/upnp/upnpport_6zz9 on Sep. 27, 2001].

[Author Unknown] "C# Language Specification," Microsoft Corp., Microsoft Press, pp. 1-41 (2001).

W. Newman et al., "Cam-Works: A Video-based Tool for Efficient Capture from Paper Source Documents," *Proceedings of the International Conference on Multimedia Computing and Systems*, Florence, Italy, vol. 2, pp. 647-653 (1999).

J. Ockerbloom, *Mediating Among Diverse Data Formats*, Ph.D. thesis, Carnegie Mellon University, pp. 1-150 (1999).

[Author Unknown] "White Paper: Salutation Architecture: Overview," Salutation Consortium (1998) [Retrieved from the Internet at http://www.salutation.org/whitepaper/originalwp.pdf on Sep. 27, 2001].

E. Saund, "Bringing the Marks on a Whiteboard to Electronic Life," *Cooperative Buildings: Integrating Information, Organizations, and Architecture, Second International Workshop*, Xerox Palo Alto Research Center (1999).

[Author Unknown] "JavaBeans Specification," Sun Microsystems, pp. 1-114 (1997) [Retrieved from the Internet at http://ja-va.sun.com/products/javabeans/docs/beans.101.pdf on Sep. 14, 2001].

[Author Unknown] "Jini Discovery and Join Specification," Sun Microsystems, pp. 1-32 (1999).

[Author Unknown] "UDDI Technical Whitepaper," Universal Description, Discovery, and Integration Consortium, pp. 1-12 (2000) [Retrieved from the Internet at http://www.uddi.org/pubs/Iru_UDDI_Technical_White_Paper.PDF on Sep. 14, 2001].

B. Venners, *Jini Service UI Draft Specification* (2000) [Retrieved from the Internet at http://www.artima.com/jini/servi-ceui/DraftSpec.html on Sep. 27, 2001].

J. Waldo, "The Jini Architecture for Network-centric Computing," *Communications of the ACM*, 42:7, pp. 76-82 (1999).

M. Weiser et al., "Designing Calm Technology" (1995) [Retrieved from the Internet at http://www.fxpal.com/ConferencesWorkshops/chi97/white-papers/Mark%2520Weiser.html on Oct. 10, 2001].

A. Wollrath et al., "A Distributed Object Model for the Java System," *USENIX Computing Systems*, vol. 9 (1996).

*Jini™ Architectural Overview Technical White Paper*, Sun Microsystems, Inc., Palo Alto, California, pp. 1-23 (1999).

*Jini™ Technology Glossary*, Sun Microsystems, Inc., Palo Alto, California, pp. 479-499 (2000).

*Jini™ Device Architecture Specification*, Sun Microsystems, Inc., Palo Alto, California, pp. 1-14 (2000).

*JavaSpaces™ Service Specification*, Sun Microsystems, Inc., Palo Alto, California, pp. 1-24 (2000).

*Jini™ Technology Core Platform Specification*, Sun Microsystems, Inc., Palo Alto, California, pp. 1-126 (2000).

*A Collection of Jini™ Technology Helper Utilities and Services Specifications*, Sun Microsystems, Inc., Palo Alto, California, pp. 1-214 (2000).

*Universal Description, Discovery and Integration Data Structure Reference V1.0*, Ariba, Inc. and International Business Machines Corporation and Microsoft Corporation, pp. 1-31 (2000).

*Universal Description, Discovery and Integration Programmer's API 1.0*, Ariba, Inc., International Business Machines Corporation and Microsoft Corporation, pp. 1-67 (2000).

*Universal Description, Discovery and Integration Technical White Paper*, Ariba, Inc., International Business Machines Corporation and Microsoft Corporation, pp. 1-12 (2000).

*Mapping Salutation Architecture APIs to Bluetooth Service Discovery Layer*, Version 1, IBM Corp., pp. 1-26 (1999).

*Bluetooth Protocol Architecture*, Version 1, Nokia Mobile Phones, pp. 1-20 (1999).

[Author Unknown] "Jini™ Architecture Specification," Sun Microsystems, pp. 1-22 (2001) [Retrieved from the Internet at http://www.sun.com/software/jini/specs/index/html on May 4, 2004].

[Author Unkown] "Service Discovery Protocol (SDP)," Bluetooth Specification Version 1.0 B, Part E, pp. 324-384 (1999) [Retrieved from the Internet at http://www.panatec.de/html/Bluetooth/bluetooth_e.pdf on May 4, 2004].

McManis, C., "Take an In-Depth Look at the Java Reflection API," pp. 1-7 (1997) [Retrieved from the Internet at http://www.javaworld.com/javaworld/jw-09-1997/jw-09-indepth_p.html on May 4, 2004].

Cable, L., "Extensible runtime Containment and Service Protocol for JavaBeans Version 1.0," pp. 1-23 (1998) [Retrieved from the Internet at http://www.java.sun.com/products/javabeans/glasgow/beancontext.pdf on May 4, 2004].

U.S. Appl. No. 09/838,933, filed Apr. 20, 2001, Newman et al.

U.S. Appl. No. 10/058,268, filed Jan. 29, 2002, Newman et al.

\* cited by examiner

SYSTEM AND METHOD FOR PROVIDING CONTEXT INFORMATION

FIELD OF THE INVENTION

This invention relates generally to communication systems and methods and, more particularly, to a system and method for enabling arbitrary components to transfer contextual data between each other using one or more universal interfaces while having no prior knowledge of each other.

BACKGROUND OF THE INVENTION

In data communication environments, such as a distributed network, many different vendors provide a number of products for specific services. Heretofore, a predetermined set of domain-specific protocols has been required to be specified to enable arbitrary components in the environment to communicate with each other, assuming the components were transmitting or receiving data, hereinafter referred to as ("transferring data"). For example, a device manufactured by one vendor would have difficulty communicating with a device manufactured by another vendor without using the predetermined set of protocols mentioned above. The problem of different vendors requiring different predetermined protocols has been partially dealt with by adopting existing protocol standards. However, there are different standards organizations and thus different protocol standards.

When arbitrary components such as computer applications or programs, data, memory, file directories, individual files, printer devices, cellular telephones, facsimile machines, copier machines, scanner devices, desk-top computers, lap-top computers, personal digital assistant ("PDA") systems, or any other device, for example, attempt to communicate without having a priori knowledge of each other, particular domain-specific protocols, such as the file system domain (e.g., NFS and CIFS) or the printer domain (e.g., IPP and LPR), must be known a priori by both parties to successfully communicate. An arbitrary component, such as a PDA attempting to communicate with a file system, or a printer device attempting to do the same, must be explicitly programmed to understand one or more of the standardized protocols mentioned above. An example includes a computer device or application having to be programmed to understand a printer device by installing a domain-specific printer driver. If the device or application is programmed to understand how to communicate and use a printer device, generically, the driver will only enable the device or application to access a particular type of printer device and not the universe of all printer devices. Thus, when new and unknown components enter the equation, the application must be reprogrammed to understand the new standardized protocols used to communicate with the new components. Referring to the above computer and printer device example, if a new type of printer were introduced, the computer device would have to be re-programmed to be able to transfer data with the new printer device by installing a printer driver specific to the new printer device. Thus, each application must be explicitly written to use a particular set of standardized protocols a priori to communicating with the components associated with the protocols.

In a system such as Jini™, developed by Sun Microsystems of Palo Alto, Calif. and described in "A collection of Jini™Technology Helper Utilities and Services Specifications," Palo Alto, Calif., Sun Microsystems, Inc., pp. 1-214, 2000; and "Jini™ Technology Core Platform Specification," Palo Alto, Calif., Sun Microsystems, Inc., pp. 1-126, 2000, all of which are hereby incorporated by reference in their entirety, which uses domain-specific interfaces, in order for a component such as a PDA system to communicate with another component such as a printer, the PDA system must contain a priori knowledge of the semantics of the printer's programmatic interfaces. In other words, a component that knows how to print still might not know how to transfer data between a file system, a scanner device or a network translation service until it is explicitly programmed to know how to communicate with the interface for the particular components.

Additionally, some systems maintain contextual information in an ad hoc manner with respect to the components within the system. Such contextual information is often represented in various formats depending on the type of component it represents, such as whether the component is a user, a document or application. This often makes it difficult or impossible for arbitrary components within a system to provide each other with current contextual information, particularly if the arbitrary components do not have a priori knowledge of each other.

SUMMARY OF THE INVENTION

A system for providing context information in accordance with embodiments of the present invention includes a plurality of components where a first component in the plurality of components has a universal contextual interface associated with instructions for transferring contextual data, and a second component in the plurality of components that invokes the universal contextual interface to execute the instructions to transfer the contextual data between the first component and at least one of the plurality of components where the components have no prior knowledge of each other.

A method and a program storage device readable by a machine and tangibly embodying a program of instructions executable by the machine for providing context information in accordance with embodiments of the present invention include invoking a universal contextual interface associated with a first component, the contextual interface being associated with instructions for transferring contextual data, and executing the instructions to transfer the contextual data between a first component and a second component where the components have no prior knowledge of each other.

The present invention allows components using the same or different communication protocols and/or data types to transfer context information data between each other without requiring the components to use domain-specific interfaces, protocols or data formats. Moreover, the present invention provides for enabling users, devices or applications to retrieve and provide each other with current context information and other data directly to each other without requiring the components to have prior knowledge of each other.

DETAILED DESCRIPTION OF THE INVENTION

Figure 1:
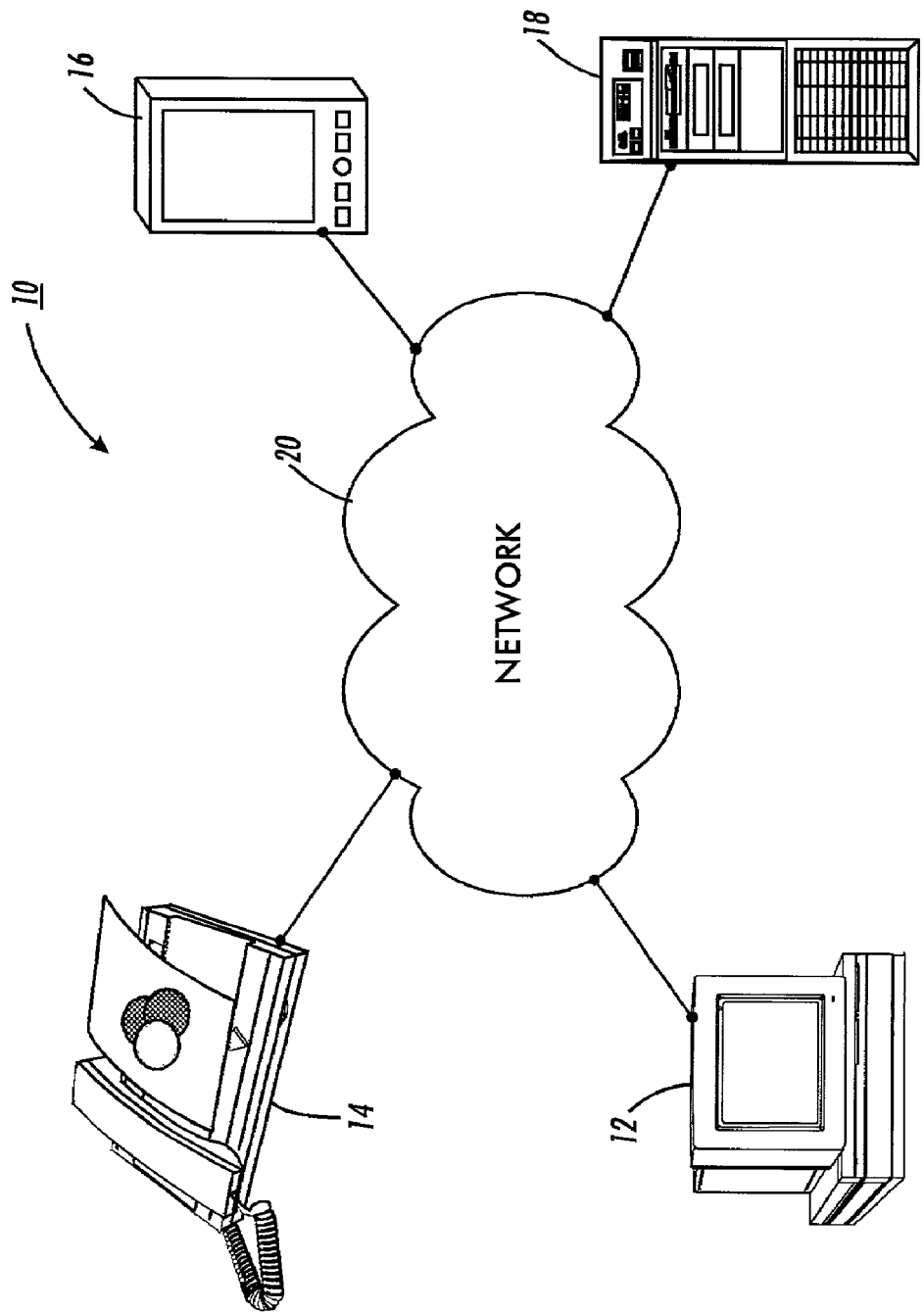
FIG. 1 is a perspective view of a system for providing context information in accordance with embodiments of the present invention.

A system 10 for providing context information in accordance with embodiments of the present invention is shown in FIG. 1. System 10 includes computer 12, printer 14, personal digital assistant ("PDA") 16 and server 18 ("components 12-18"), which are coupled together by network 20, although system 10 could comprise other types and numbers of systems and devices. A method includes invoking a universal contextual interface associated with a first component and executing instructions associated with the universal contextual interface to transfer the contextual data between components 12-18. The present invention allows components using the same or different communication protocols and/or data types to transfer context information between each other without requiring the components to use domain-specific interfaces, protocols or data formats. Moreover, the present invention provides for enabling users, devices or applications to retrieve and provide each other with current context information and other data directly to each other without requiring the components to have prior knowledge of each other.

Referring more specifically to FIG. 1, computer 12, printer 14, PDA 16 and server 18 are coupled to and may communicate with each other by way of network 20, although the components 12-18 may be coupled directly to each other (e.g., a peer-to-peer system). In embodiments of the present invention, network 20 comprises a wide area network ("WAN") such as the Internet, although it may comprise a local area network ("LAN") such as an Ethernet® network developed by the assignees of the present invention, or a Novelle®, 3Com® or IBM PC® LAN network. Where network 20 comprises a WAN, cellular or satellite communications network systems that utilize signals such as satellite signals, radio waves, microwaves and/or infrared signals may be used. Where network 20 comprises a LAN, it may be organized in a bus network configuration, although a number of other network configurations may be utilized such as a token ring, star, tree or mesh configuration depending on the needs, resources and types of components 12-18 in network 20. Further, network 20 may comprise one or more WAN's or LAN's.

Figure 2:
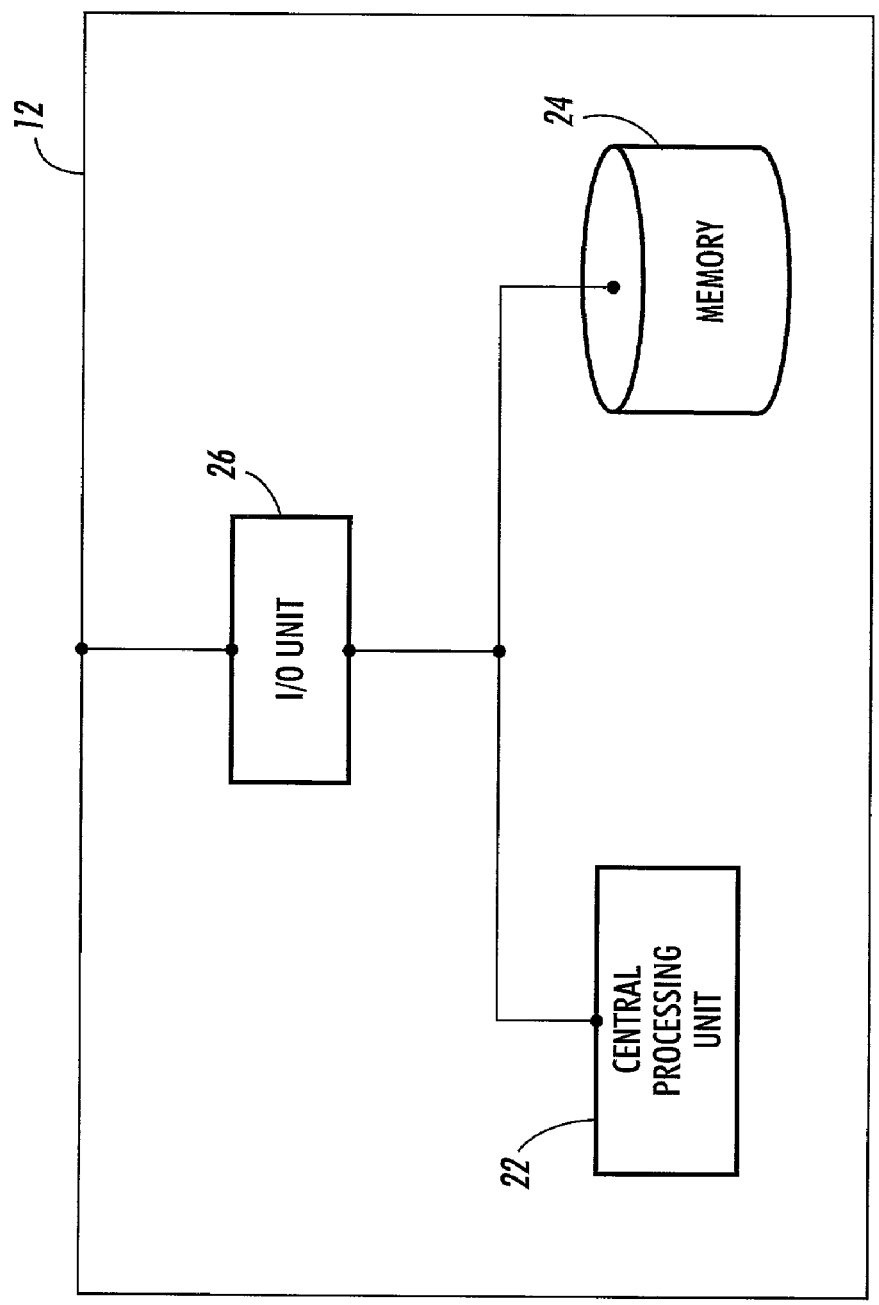
FIG. 2 is a block diagram of an exemplary arbitrary component utilized in the system for providing context information.

Referring to FIG. 2, in embodiments of the present invention computer 12 comprises a central processing unit ("CPU") 22, memory 24 and I/O unit 26, which are coupled together by one or more buses. By way of example only, computer 12 may also comprise a scanner, cellular telephone, display device, video input/output device, audio input/output device, remote control device or an appliance, although computer 12 may comprise any type of device or system that can store, process and execute instructions including devices with circuitry that are hard-wired to execute instructions for performing one or more methods of the present invention as described and illustrated herein.

Computer 12 executes instructions for an operating system environment it is operating in, such as the UNIX® environment, as described in "Advanced Programming in the UNIX® Environment," W. Richard Stevens, Addison-Wesley Publishing Company, 1974, which is hereby incorporated by reference in its entirety. In embodiments of the present invention, computer 12 does not use the same communication protocol as any of the other components 14-18, although it may use the same communication protocol as any of the other components 14-18. By way of example only, computer 12 may be operating in the UNIX® environment using a first type of communication protocol to transfer data, while printer 14 may be operating in a Microsoft Windows® environment but using a second type of communication protocol. Additionally, computer 12 may use one or more communications protocols to communicate with one or more components 14-18 on network 20, including xDSL, ISDN, TCP/IP or protocols defined by the RFC and OSI organizations.

CPU 22 may comprise an Intel Pentium III processor, although CPU 22 may comprise a number of other processors such as a picojava I or PowerPC G4 processor. The CPU 22 executes at least one program of stored instructions for a method of providing context information in accordance with embodiments of the present invention. CPU 22 may also execute instructions for other tasks, including network services such as providing data, memory, file directories, individual files, word processing applications, accounting applications or engineering applications. As a result, when one of these applications is executed, the instructions for the task, such as for creating a spreadsheet, as well as the instructions for performing one or more methods of the present invention are carried out by the CPU 22 in computer 12. The instructions may be expressed as executable programs written in a number of computer programming languages, such as BASIC, Pascal, C, C++, C#, Java, Perl, COBOL, FORTRAN, assembly language, machine code language, or any computer code or language that can be understood and performed by the CPU 22.

Memory 24 may comprise any type of fixed or portable memory device accessible by the CPU 22, such as hard-disks, floppy-disks, compact disks, digital video disks, magnetic tape, optical disk, ferroelectric memory, ferromagnetic memory, read only memory, random access memory, electrically erasable programmable read only memory, erasable programmable read only memory, flash memory, static random access memory, dynamic random access memory, charge coupled devices, smart cards, or any other type of computer-readable mediums. Memory 24 stores instructions and data for performing the present invention for execution by CPU 22, although some or all of these instructions and data may be stored elsewhere. Although the CPU 22 and memory 24 are shown in the same physical location, they may be located at different physical locations, such as in server 18.

I/O unit 26 couples computer 12 to network 20 to allow computer 12 to communicate with network 20, and hence components 14-18. In embodiments of the present invention, I/O unit 26 may comprise a router such as any type of Ethernet based device, although I/O unit 26 may comprise a modem device using a dial-up communication system through private branch exchanges ("PBX") and public switched telephone lines.

Referring back to FIG. 1, printer 14 is coupled to network 20 in the same manner described above with respect to computer 12 and network 20. In embodiments of the present invention, printer 14 comprises a printing device capable of rendering graphical representations on a printing medium, for example.

PDA 16 is coupled is to network 20 in the same manner described above with respect to computer 12 and network 20, including a wireless communication connection. In embodiments of the present invention, PDA 16 comprises a hand held computing device that may perform such functions as telephony, facsimile transmissions or networking.

Server 18 is coupled to network 20 in the same manner described above with respect to computer 12 and network 20.

Server 18 comprises a computer system having one or more CPU's, memory and I/O units, which are coupled together by one or more buses and used by server 18 to store and process instructions in accordance with embodiments of the present invention as described further herein.

While components such as computer 12, printer 14, PDA 16 and server 18 have been used as examples in embodiments of the present invention, by way of example only, a number of other systems may be used as components 12-18 such as software services, files, applications or portions thereof including language translation services, data format converters, e-mail applications, calendar applications, or a spell checking routine executing within a word processing application.

Figure 3:
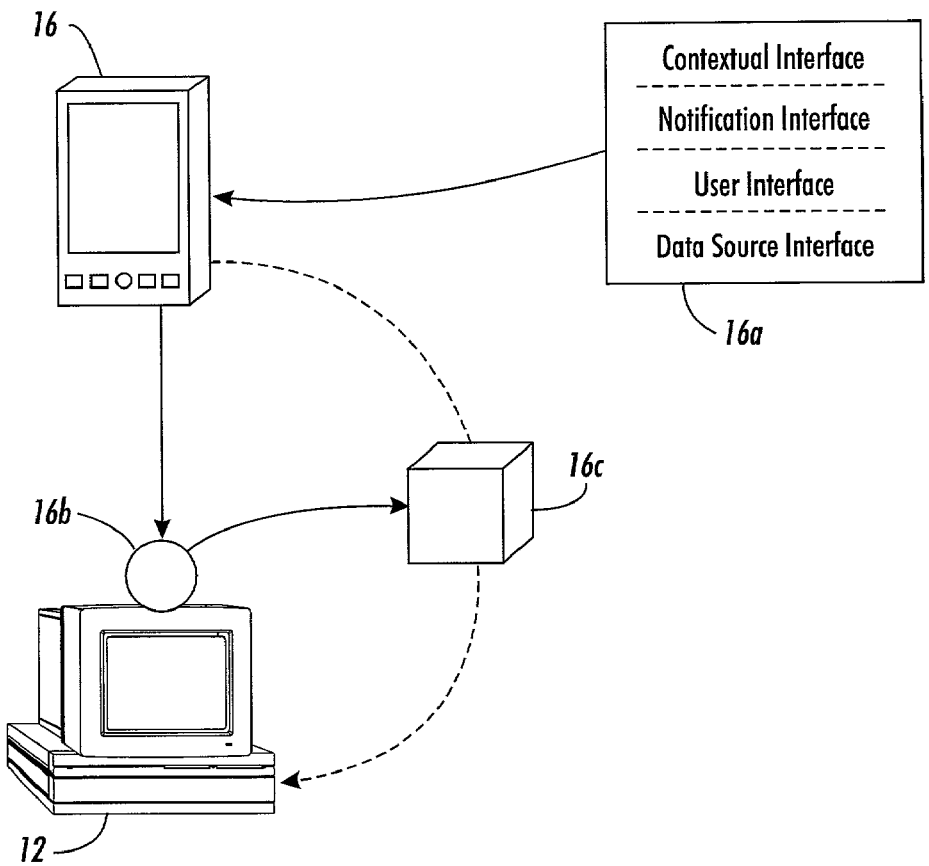
FIG. 3 is a partial perspective view of a system for providing context information in accordance with embodiments of the present invention.

Referring to FIG. 3, computer 12 is coupled to PDA 16 as described above in connection with FIG. 1. PDA 16 has stored in a memory or otherwise has access to, which will hereinafter be referred to as being "associated with," a set of universal interfaces 16a comprising a contextual interface, a notification interface, a user interface and a data source interface. The particular number and/or combination of interfaces may vary and will depend upon the particular type of device PDA 16 is, and the capabilities and/or services desired or provided by it. Also, PDA 16, and hence the set of universal interfaces 16a, may be updated at any time to add, delete or modify interfaces.

Each of the interfaces in the set of universal interfaces 16a comprise instructions, sets of operations and/or other data that are particular to PDA 16 yet can be understood and performed by computer 12 to enable it to communicate and transfer (i.e., transmitting or receiving) contextual data with PDA 16, provide event notifications to computer 12 with respect to changes in contextual data for PDA 16, enable computer 12 to receive user interfaces to allow users of computer 12 to view changed contextual data or enable computer 12 to receive data from PDA 16. Moreover, while each of the interfaces will be described below, a detailed description of these and other interfaces is included in co-pending U.S. patent application Ser. No. 09/838,933 titled "SYSTEM AND METHOD FOR ENABLING COMMUNICATION AMONG ARBITRARY COMPONENTS," filed on Apr. 20, 2001 by Edwards et al., which is hereby incorporated by reference in its entirety.

In particular, the contextual interface comprises a getContext( ) operation that may include instructions, operations and data that may be performed by computer 12 to request and access a context object 16c, which will be described in further detail herein. Contextual data may include information with respect to PDA 16 such as its type (i.e., make and model), owner, history of use, whether PDA 16 is currently in use or other operating status information, identity, location on network 20, administrative domain, information with respect to one or more users of PDA 16 or files stored at PDA 16, or any other type of environment information that PDA 16 may provide, for example. Further, contextual data may also include computer language instructions particular to PDA 16 that may be understood and executed by computer 12. In embodiments of the present invention, the contextual data may be stored in a memory at PDA 16 in any format depending upon the particular type of device or application PDA 16 is, such as a multi-valued data structure that resembles a hash table or a data structure comprising an array of records, for example.

In embodiments of the present invention, a context object 16c associated with PDA 16 may be referenced by computer 12 through the getContexto operation. The context object 16c may comprise a live, remote reference to one or more operations associated with the getContext( ) operation including a getProperty( ) and a setProperty( ) operation as well as any other instructions that enable computer 12 to access current contextual data associated with PDA 16, although the object 16c may directly include the contextual data. In particular, the instructions may communicate with PDA 16 using a first protocol such as an IR protocol, the type of protocol depending upon the type required by the manufacturer of PDA 16. The getproperty( ) operation may include instructions for requesting that contextual data be returned to computer 12 from PDA 16 so computer 12 may read the contextual data associated with PDA 16, although the getproperty( ) operation may also include the actual contextual data associated with PDA 16. The setproperty( ) operation includes instructions and data that may be performed by computer 12 to provide PDA 16 with contextual data so computer 12 may write its contextual data to a memory associated with PDA 16.

The notification interface comprises a registers( ) operation that may include instructions, operations and data that may be performed by computer 12 to enable it to register itself as a listener with respect to PDA 16 for receiving asynchronous notifications about changes to the contextual data of PDA 16, although it may receive synchronous notifications as well. The notification interface may be passed one or more parameters when invoked, including a component parameter and a context parameter. The component parameter identifies computer 12 as the recipient of the notifications, although printer 14 and server 18 may also be identified. The context parameter comprises current contextual data representing one or more properties that may be relevant to PDA 16 for deciding whether it should provide notifications to computer 12. Alternatively, the context parameter may comprise a context object providing PDA 16 with a live, remote reference to the contextual data associated with computer 12. The context object of computer 12 would be the same as the context object 16c of PDA 16, except it would be associated with computer 12. In embodiments of the present invention, PDA 16 is programmed to send notifications to registered listeners (i.e., computer 12) when its contextual data changes, although PDA 16 may send the notifications at predetermined time increments.

The user interface comprises a getUI( ) operation that may include instructions, operations and data that may be performed by computer 12 for generating a user window. In particular, the getUI( ) operation returns to computer 12, from PDA 16, a user window object having instructions that may be executed by computer 12 to generate and display a user interface window to enable users at computer 12 to access the contextual data associated with PDA 16. In embodiments of the present invention, computer 12 passes its context parameter to the getUI( ) operation when invoking it for a variety of reasons, such as for security purposes to identify a user at computer 12 to PDA 16 or for identifying the location of computer 12 on the network 20. PDA 16 may decide whether to provide computer 12 with its user interface based upon the contextual data provided by way of the context parameter. Moreover, computer 12 may be programmed to generate a user window to display the contextual data associated with PDA 16 upon receiving event notifications with respect to changed contextual data associated with PDA 16 as described above.

The data source interface comprises a beginTransferSession( ) operation that may include instructions and data that can be performed by computer 12 to establish a data transfer session to enable computer 12 to receive data from PDA 16. Moreover, the beginTransferSession( ) operation may be passed parameters when invoked such as a context parameter. In embodiments of the present invention, computer 12 passes its context parameter to the beginTransferSession( ) operation when invoking it to inform PDA 16 of its identity for the same reasons described above with respect to computer 12 for providing PDA 16 with its context parameter when invoking the getUI( ) operation. PDA 16 may decide whether to transmit data to computer 12 or modify its behavior during data transfer based upon the contextual data provided in the context parameter. For example, if computer 12 requests a data transfer (e.g., file transfer) with PDA 16, PDA 16 may provide the data (i.e., the file) to a particular location at computer 12 (e.g., a root directory) or to another location (e.g., printer 14 or server 18) based upon the contextual data (e.g., the identity of the user at computer 12) included in the context parameter.

Each of the above-described interfaces and associated operations may comprise mobile code. Mobile code is executable data that can be transmitted to computer 12 where it may be executed. For example, Java is an implementation of executable content (i.e., mobile code) that is widely used on the Internet. Users may download mobile code from the Internet, for example, and locally run a program written in a truly common programming language. In embodiments of the present invention, the mobile code comprises object oriented mobile code, which is a programming methodology well known in the programming arts where data types may be defined along with associated procedures or sets of instructions, the data types in this context often referred to as classes. Thus, a set of procedures or instructions may be associated with one or more data types. Moreover, the same name or identifier can be assigned to identify a procedure or a set of instructions that perform corresponding instructions depending upon the particular data types associated therewith, often referred to as polymorphism. In embodiments of the present invention, when the set of universal interfaces 16a is provided to computer 12, the procedures, sets of instructions and other data associated with the particular interface become available to computer 12 to access and perform as described herein. Still further, the interfaces may comprise sets of instructions or references to other interfaces, wherein computer 12 could utilize the data or perform the instructions accordingly.

In embodiments of the present invention, using the above-described mobile code is optional. In particular, computer 12 may also directly access each of the interfaces included in the set of universal interfaces 16a without needing to access data object 16b. Further, the above-described operations would be available to computer 12 directly through each of the universal interfaces described above. In this example, the set of universal interfaces 16a would comprise the same instructions, sets of operations and/or other data that could be understood and performed by computer 12 to enable it to communicate with PDA 16 as well as the other functions described herein. Thus, in this example, mobile code may not be required although it could be used as necessary.

Data object 16b is a proxy object for PDA 16 and is received from PDA 16 and stored in computer 12, although the data object 16b may be stored elsewhere such as at server 18. The set of universal interfaces 16a is accessible to computer 12 through the data object 16b. More specifically, data object 16b supports the various operations defined by the interfaces in the set of universal interfaces 16a associated with PDA 16, which are assumed to be known and understood by computer 12. The data object 16b comprises instructions (i.e., computer executable code) and/or data that provide particular implementations of the one or more interfaces associated with the PDA 16 from which the data object 16b is associated with. For example, data object 16b provides a custom implementation of the contextual interface that would be specialized to communicate with PDA 16 using whichever protocols and/or data formats have been decided upon by the developer of PDA 16. In embodiments of the present invention, computer 12 is programmed to access the set of universal interfaces 16a through data object 16b using a number of protocols to effect the different types of communications as described herein, such as Java remote method invocation ("RMI").

Figure 4:
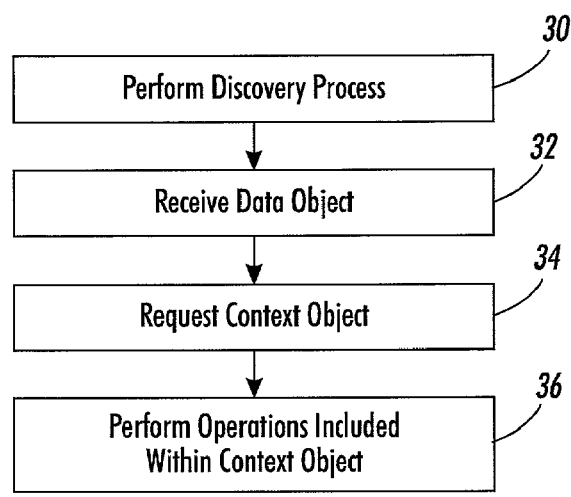
FIG. 4 is a flow chart of a process for providing context information.

Referring to FIG. 4 and beginning at step 30, computer 12 performs a discovery process to determine whether PDA 16 can provide it with contextual data. In embodiments of the present invention, computer 12 discovers PDA 16 by using the Bluetooth™ Service Location Protocol ("SLP") discovery system developed by Bluetooth SIG, inc., and described in "Specification of the Bluetooth System," Version 1.1 core, Bluetooth Consortium 2001, although a number of other systems may be used such as the Universal Description, Discovery, and Integration Protocol ("UDDI"), developed by the Ariba, IBM and Microsoft Corps., and described in "UDDI Technical Whitepaper," Universal Description, Discovery, and Integration Consortium, pp. 1-12, 2000; "Universal Description, Discovery and Integration Data Structure Reference V 1.0," Ariba, Inc., International Business Machines Corporation and Microsoft Corporation, pp. 1-31, 2000; "Universal Description, Discovery and Integration Programmer's API 1.0," Ariba, Inc. and International Business Machines Corporation and Microsoft Corporation, pp. 1-67, 2000; and "Universal Description, Discovery and Integration Technical White Paper," Ariba, Inc., International Business Machines Corporation and Microsoft Corporation, pp. 1-12, 2000, the various Jini™ system discovery protocols or using a simple lookup in a name server, for example, all of which are hereby incorporated by reference in their entirety.

Next at step 32, discovered PDA 16 returns data object 16b to computer 12. Computer 12 may introspect the received data object 16b to determine which one or more universal interfaces are associated with PDA 16. Computer 12 determines that PDA 16 is at least associated with a contextual interface, and thus PDA 16 can provide it with contextual data.

Next at step 34, computer 12 uses the procedures, instructions and/or data defined in the data object 16b to invoke the getContext( ) interface associated with PDA 16 to request the context object 16c from PDA 16. As computer 12 requests access to the contextual data through the context object 16c, the instructions included in the object 16c may translate the requests into a first protocol (e.g., IR protocol) supported by PDA 16 to accomplish the access to the contextual data.

Next at step 36, computer 12 receives the context object 16c and invokes the associated getProperty( ) operation to retrieve the contextual data from the PDA 16. In particular, the contextual data is transferred from PDA 16 to computer 12 through the context object 16c. Moreover, when computer 12 performs the getProperty( ) operation, PDA 16 may return instructions, operations or data directly to computer 12 to enable it to understand the contextual data being transferred from PDA 16. Further, the context object 16c transmits the request for contextual data to PDA 16, although the object 16c may include the contextual data in which case computer 12 accesses the data therein. In either case, computer 12 receives the contextual data from the PDA 16.

In another embodiment, steps 30-36 are performed as described above in embodiments of the present invention except at step 36, computer 12 invokes the associated set- Property( ) operation to send its own contextual data to the PDA 16. Moreover, when computer 12 receives the context object 16*c*, computer 12 may access and execute the instructions included in the object 16*c* to enable computer 12 to provide the contextual data to PDA 16 in a format that PDA 16 will understand. Thus, computer 12 may transfer its own associated contextual data, in its own format and using its own protocol, to PDA 16 through the context object 16*c*. In particular, the context object 16*c* transmits the request and negotiates with PDA 16 to enable computer 12 to send its data. Computer 12 transmits its contextual data to PDA 16, which stores the received data at a memory associated with it, although it could store the data elsewhere such as server 18.

In another embodiment, steps 30-36 are performed as described above in embodiments of the present invention except at steps 30-32, computer 12 introspects the data object 16*b* and determines PDA 16 is also associated with the notification and user interfaces. Computer 12 may therefore register itself as a listener with PDA 16 to receive event notifications with respect to changes in the contextual data associated with PDA 16. At step 34, in this embodiment computer 12 may query PDA 16 about what particular types of contextual data, if any, it must provide to PDA 16 to register itself as a listener. Thus, step 34 is performed as described above and computer 12 requests the context object 16*c*, but here the instructions, data and operations included in the object 16*c* represent the particular types of contextual data computer 12 must include in the context parameter it provides to PDA 16 when invoking the registers( ) operation associated with the notification interface. Step 36 is performed as described above and computer 12 invokes the registers( ) operation to register itself and includes the required types of contextual data in the context parameter, although computer 12 may pass its own context object into the context parameter. PDA 16 decides to allow computer 12 to register as a listener and thus computer 12 may receive event notifications from PDA 16 through the context object 16*c* as changes in its contextual data occur. Further, in this example computer 12 may invoke the getUI( ) operation as event notifications are received to generate the user window associated with PDA 16 to enable users at computer 12 to view the changed contextual data associated with PDA 16.

In another embodiment, steps 30-36 are performed as described above in embodiments of the present invention except at steps 30-32, computer 12 introspects the received data object 16*b* and determines PDA 16 is also associated with a data source interface. Thus, PDA 16 may transfer other types of data with computer 12 besides its associated contextual data, such as a continuous stream of data (e.g., streaming video). At step 34, in this embodiment computer 12 may query PDA 16 about what particular types of contextual data, if any, it must provide to PDA 16 to utilize the data source interface for receiving data. Thus, step 34 is performed as described above and computer 12 requests the context object 16*c*, but here the instructions, data and operations included in the object 16*c* represent the particular types of contextual data computer 12 must include in the context parameter it provides to PDA 16 when invoking the beginTransferSession( ) operation associated with the data source operation. Step 36 is performed as described above, except computer 12 also invokes the beginTransferSession( ) operation to receive a data transfer session object and includes the required types of contextual data in the context parameter it provides when it invokes the operation. Computer 12 receives the data transfer session object and may execute instructions included in it to receive data from PDA 16. In this embodiment, PDA 16 may maintain a context parameter database in its associated memory. In particular, PDA 16 may store in the parameter database the context parameter provided to it by computer 12 in step 36. Thus, PDA 16 may store a number of context parameters that have been provided to it by one or more components 12-18 in performing step 36. The PDA 16 may use the stored context parameters to establish a history of use and may include the information in contextual data it provides to components 12-18, for example.

Figure 5:
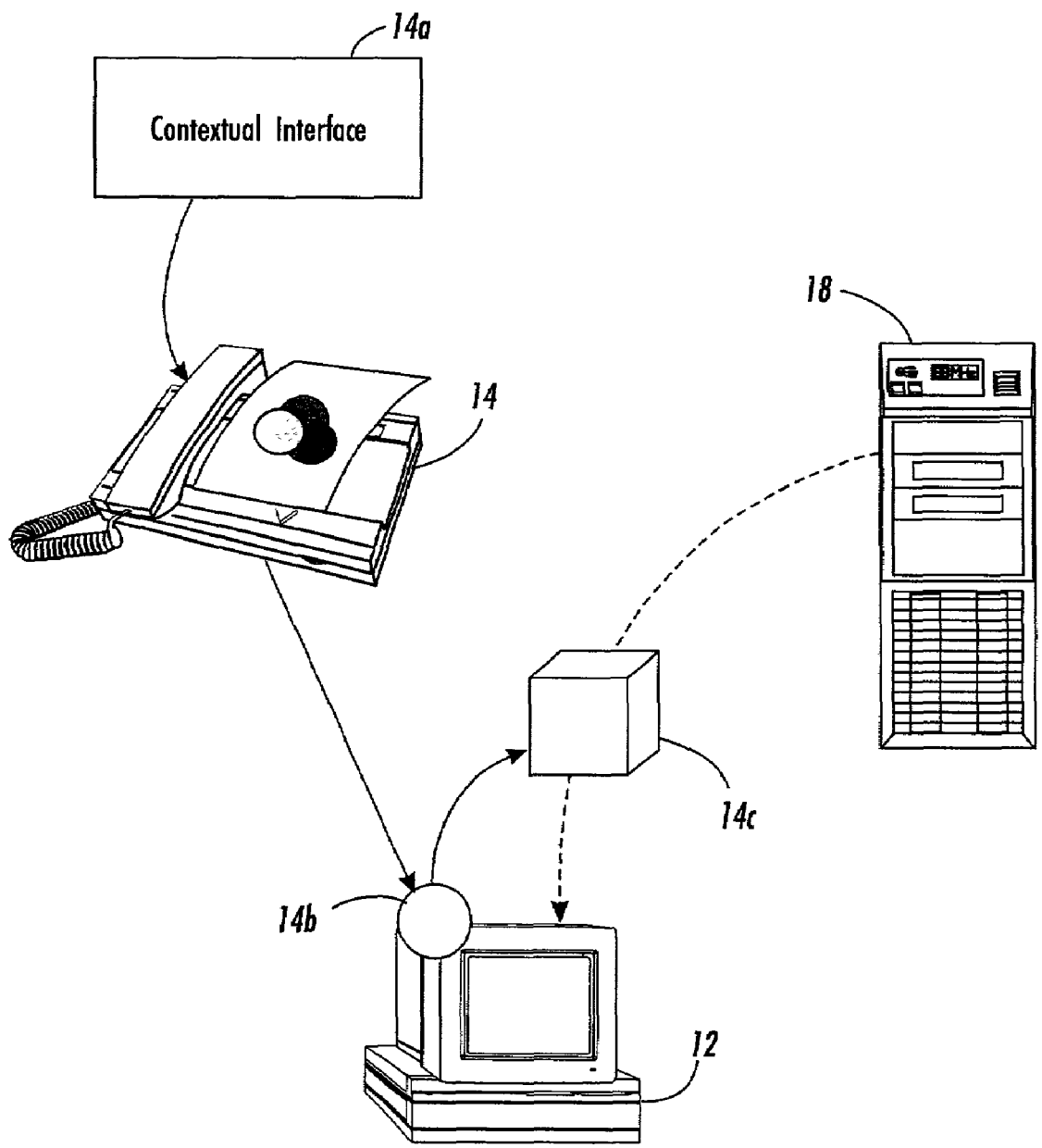
FIG. 5 is a partial perspective view of a system for providing context information in accordance with embodiments of the present invention.

Referring to FIG. 5, computer 12, printer 14 and server 18 are coupled to each other as described above in connection with FIG. 1. In this embodiment, printer 14 is associated with a set of universal interfaces 14*a* comprising a contextual interface. The contextual interface in this embodiment is the same as the contextual interface described above in connection with FIGS. 3-5, except it includes instructions specific to printer 14 that may be executed by computer 12.

Figure 6:
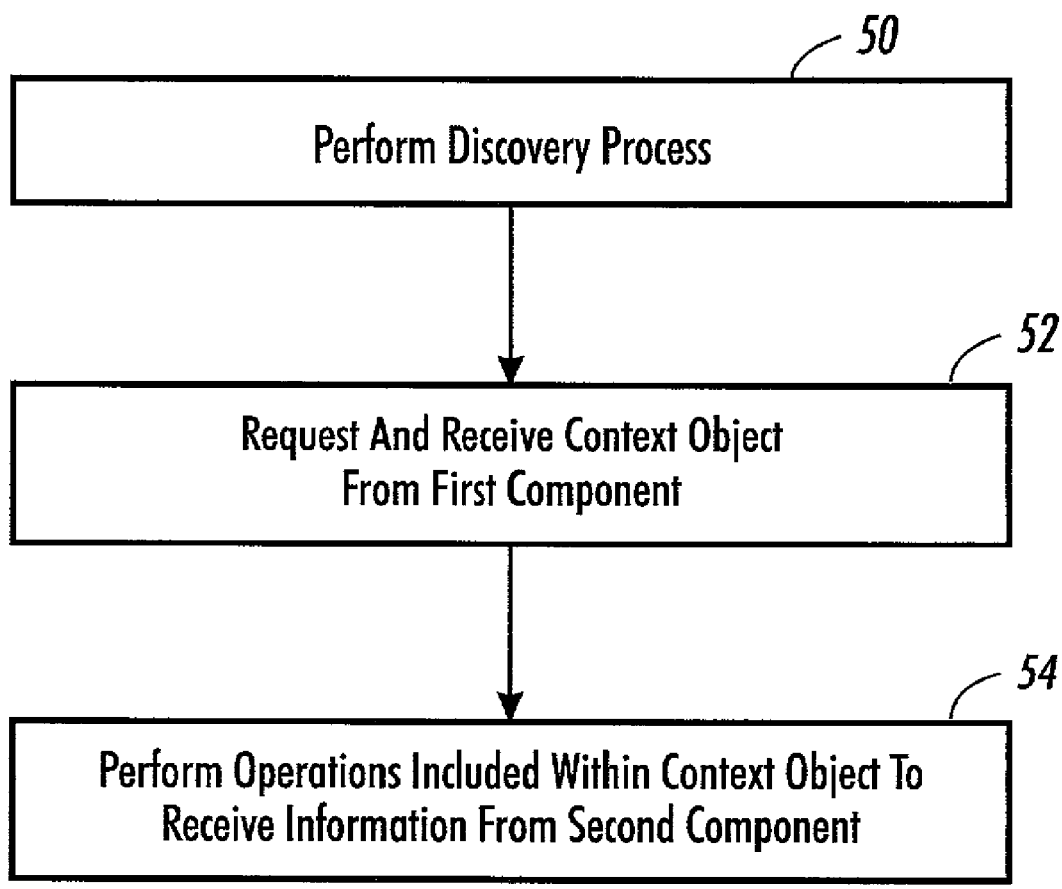
FIG. 6 is a flow chart of a process for providing context information.

Referring to FIG. 6 and beginning at step 50, computer 12 performs the discovery process described above with respect to FIG. 3 at steps 30-32 except it discovers data object 14*b*. Further, computer 12 determines printer 14 is at least associated with a contextual interface, and thus printer 14 may provide computer 12 with contextual data.

Next at step 52, computer 12 uses the procedures, instructions and/or data defined in the data object 14*b* to invoke the getContext( ) interface associated with printer 14 to request the context object 14*c* as described above with respect to FIG. 3 at step 34. Thus, computer 12 receives the context object 14*c* from the printer 14 through the data object 14*b*.

Next at step 54, computer 12 invokes the getProperty( ) operation included in data object 14*b* to retrieve the contextual data associated with printer 14. In this embodiment, the contextual data associated with printer 14 may be stored at a central location such as in server 18, although the contextual data may be stored at another location such as computer 12 or PDA 16. Thus, the instructions, operations or data included in the getPproperty( ) operation that are executed by computer 12 instruct it to retrieve the contextual data associated with printer 14 from server 18. Moreover, the instructions, operations or data may include the location of the contextual data (i.e., server 18) on the network 20 and other miscellaneous instructions that may need executing by computer 12 to enable it to retrieve from and understand the contextual data being transferred from the server 18.

By way of example only, miscellaneous instructions may include instructions for contacting one or more location sensors (e.g., GPS, IR, etc.) and performing computations to integrate results obtained from the sensors to determine the location of the contextual data (i.e., server 18). Another example includes instructions for obtaining the contextual data by first attempting to access a particular service performed by one or more of components 16-18 on network 20 for providing contextual data, but using cached contextual data obtained from a prior request, if available, in the event the service is unavailable. Thus in this embodiment, computer 12 receives the contextual data associated with printer 14 from the server 18 through the context object 14*c*.

Other modifications of the present invention may occur to those skilled in the art subsequent to a review of the present application, and these modifications, including equivalents thereof, are intended to be included within the scope of the present invention. Further, the recited order of processing elements or sequences, or the use of numbers, letters, or other designations therefor, is not intended to limit the claimed processes to any order except as may be specified in the claims.

What is claimed is:

1. A system comprising:
a plurality of devices, wherein devices within the plurality of devices communicate with incompatible protocols comprising: file system domain protocols and printer domain protocols;
a first device in the plurality of devices having a universal contextual interface,
wherein the universal contextual interface does not have a priori knowledge of the devices' file system domain protocol or the devices' printer domain protocol,
wherein the devices' file system domain protocol comprises Network File System (NSF) or Common Internet File System (CIFS),
wherein the devices' printer domain protocol comprises Internet Printing Protocol (IPP) or Line Printer Daemon,
wherein the universal contextual interface is implemented in Java;
wherein the universal contextual interface comprises instructions that are particular to the first device, wherein the instructions can:
be understood and performed by the plurality of devices to enable the plurality of devices to communicate and transfer contextual data with the first device;
provide event notifications to the plurality of devices with respect to changes in contextual data for the first device; and
enable the plurality of devices to receive user interfaces to allow users of the plurality of devices to view changed contextual data or enable the plurality of devices to receive data from the first device; and
wherein contextual data includes information with respect to the first device including type, owner, history of use, whether the first device is currently in use, other operating status information, identity, location on network, administrative domain, information with respect to one or more users of the first device or files stored at the first device; and
a second device in the plurality of devices that invokes the universal contextual interface of the first device by executing the instructions to transfer the contextual data associated with the first device between the first device and at least one of the other devices in the plurality of devices, the plurality of devices having no prior knowledge of each other;
wherein the universal contextual interface is directly invoked by the second device to allow the contextual data to be transferred to the second device;
wherein the second device registers as a listener with the first device through a notification interface of the first device to receive event notifications with respect to changes in the contextual data associated with the first device; and
wherein the universal contextual interface allows components using different operating systems, communication protocols, file formats, and data types to transfer context information between each other without requiring the components to use domain-specific interfaces, protocols, or data format.

2. The system as set forth in claim 1 wherein the at least one of the plurality of devices comprises the second device.

3. The system as set forth in claim 1 wherein the first device sends a context object to the second device to be used by the second device to transfer the contextual data.

4. The system as set forth in claim 1 wherein the second device receives a context object from the first device to be used by the at least one of the plurality of devices for receiving contextual data transmitted from the first device.

5. The system as set forth in claim 1 wherein the at least one of the plurality of devices uses the contextual data as a criteria to authorize the first device or the second device to access instructions, data or operations associated with the at least one of the plurality of devices.

6. The system as set forth in claim 1 wherein the universal contextual interface or a context object have source-specific, object-oriented mobile code that can be understood and performed by the at least one of the plurality of devices to receive contextual data.

7. The system as set forth in claim 1 wherein the plurality of devices further comprise at least one software application or at least one file.

8. The system as set forth in claim 1 wherein the first device further comprises a historical database having at least one record of data provided by the second device during invocation of the universal contextual interface.

9. The system as set forth in claim 1 wherein the second device invokes a universal notification interface to register the at least one of the plurality of devices to receive an event notification each time the contextual data changes.

10. The system as set forth in claim 1 wherein the contextual data comprises executable computer language instructions, or a type, operating status, identity, location, administrative domain or environment information of at least one of the plurality of devices.

11. A method for providing context information, the method comprising:
invoking a universal contextual interface associated with a first device in a plurality of devices, wherein devices within the plurality of devices communicate with incompatible protocols comprising: file system domain protocols and printer domain protocols, and wherein the universal contextual interface is implemented in Java,
wherein the universal contextual interface does not have a priori knowledge of the devices' file system domain protocol or the devices' printer domain protocol,
wherein the devices' file system domain protocol comprises Network File System (NSF) or Common Internet File System (CIFS),
wherein the devices' printer domain protocol comprises Internet Printing Protocol (IPP) or Line Printer Daemon,
wherein the universal contextual interface comprises instructions that are particular to the first device, wherein the instructions can:
be understood and performed by the plurality of devices to enable the plurality of devices to communicate and transfer contextual data with the first device;
provide event notifications to the plurality of devices with respect to changes in contextual data for the first device; and
enable the plurality of devices to receive user interfaces to allow users of the plurality of devices to view changed contextual data or enable the plurality of devices to receive data from the first device; and
wherein contextual data includes information with respect to the first device including type, owner, history of use, whether the first device is currently in use, other operating status information, identity, location on network, administrative domain, information with respect to one or more users of the first device or files stored at the first device; and wherein invoking the universal contextual interface involves executing the instructions to transfer the contextual data associated with the first device between the first device and a second device in the plurality of devices, the plurality of devices having no prior knowledge of each other;

wherein the universal contextual interface is directly invoked by the second device to allow the contextual data to be transferred to the second device;

wherein the second device registers as a listener with the first device through a notification interface of the first device to receive event notifications with respect to changes in the contextual data associated with the first device; and wherein the universal contextual interface allows components using different operating systems, communication protocols, file formats, and data types to transfer context information between each other without requiring the components to use domain-specific interfaces, protocols, or data format.

12. The method as set forth in claim 11 wherein the second device or a third device in the plurality of devices perform the invoking and executing.

13. The method as set forth in claim 11 further comprising sending a context object to the at least one of the plurality of devices to be used for transferring the contextual data.

14. The method as set forth in claim 11 further comprising using the contextual data as a criteria to authorize the second device to access instructions, data or operations associated with the one of the plurality of devices.

15. The method as set forth in claim 11 wherein the universal contextual interface or a context object have source-specific, object-oriented mobile code that can be interpreted and performed by the first device or the at least one of the plurality of devices to receive contextual data.

16. The method as set forth in claim 11 wherein the plurality of devices further comprise at least one software application or at least one file.

17. The method as set forth in claim 11 further comprising storing in a historical database at least one record of data provided during invocation of the universal contextual interface.

18. The method as set forth in claim 11 further comprising invoking a universal notification interface to register the at least one of the plurality of devices to receive an event notification each time the contextual data changes.

19. The method as set forth in claim 11 wherein the contextual data comprises executable computer programming language instructions or a type, operating status, identity, location, administrative domain or environment information of at least one of the devices or of at least one user of the plurality of devices.

20. A computer readable medium having stored thereon instructions for providing context information, which when executed by at least one processor, causes the processor to perform:

invoking a universal contextual interface associated with a first device in a plurality of devices, wherein devices within the plurality of devices communicate with incompatible protocols comprising: file system domain protocols and printer domain protocols, and wherein the universal contextual interface is implemented in Java;

wherein the universal contextual interface does not have a priori knowledge of the devices' file system domain protocol or the devices' printer domain protocol, wherein the devices' file system domain protocol comprises Network File System (NSF) or Common Internet File System (CIFS), wherein the devices' printer domain protocol comprises Internet Printing Protocol (IPP) or Line Printer Daemon, wherein the universal contextual interface comprises instructions that are particular to the first device, wherein the instructions can:

be understood and performed by the plurality of devices to enable the plurality of devices to communicate and transfer contextual data with the first device;

provide event notifications to the plurality of devices with respect to changes in contextual data for the first device; and enable the plurality of devices to receive user interfaces to allow users of the plurality of devices to view changed contextual data or enable the plurality of devices to receive data from the first device; and wherein contextual data includes information with respect to the first device including type, owner, history of use, whether the first device is currently in use, other operating status information, identity, location on network, administrative domain, information with respect to one or more users of the first device or files stored at the first device; and wherein invoking the universal contextual interface involves executing the instructions to transfer the contextual data associated with the first device between the first device in and a second device in the plurality of devices, the plurality of devices having no prior knowledge of each other; and wherein the universal contextual interface is directly invoked by the second device to allow the contextual data to be transferred to the second device;

wherein the second device registers as a listener with the first device through a notification interface of the first device to receive event notifications with respect to changes in the contextual data associated with the first device; and wherein the universal contextual interface allows components using different operating systems, communication protocols, file formats, and data types to transfer context information between each other without requiring the components to use domain-specific interfaces, protocols, or data format.

21. The medium as set forth in claim 20 wherein the second device or a third device in the plurality of devices perform the invoking and executing.

22. The medium as set forth in claim 20 further comprising sending a context object to the at least one of the plurality of devices to be used for transferring the contextual data.

23. The medium as set forth in claim 20 further comprising using the contextual data as a criteria to authorize the second device to access instructions, data or operations associated with the one of the plurality of devices.

24. The medium as set forth in claim 20 wherein the universal contextual interface or a context object have source-specific, object-oriented mobile code that can be interpreted and performed by the first device or the at least one of the plurality of devices to receive contextual data.

25. The medium as set forth in claim 20 wherein the plurality of devices further comprise at least one software application or at least one file.

26. The medium as set forth in claim 20 further comprising storing in a historical database at least one record of data provided during invocation of the universal contextual interface.

27. The medium as set forth in claim 20 further comprising invoking a universal notification interface to register the at least one of the plurality of devices to receive an event notification each time the contextual data changes.

28. The medium as set forth in claim 20 wherein the contextual data comprises executable computer programming language instructions or a type, operating status, identity, location, administrative domain or environment information of at least one of the devices or of at least one user of the plurality of devices.

* * * * *